United States Patent

[11] 3,594,084

| [72] | Inventor | George K. Turner<br>Palo Alto, Calif. |
|---|---|---|
| [21] | Appl. No. | 846,796 |
| [22] | Filed | Aug. 1, 1969 |
| [45] | Patented | July 20, 1971 |
| [73] | Assignee | G. K. Turner Associates<br>Palo Alto, Calif. |

[54] MONOCHROMATOR APPARATUS HAVING IMPROVED GRATING ROTATION MEANS
2 Claims, 6 Drawing Figs.

| [52] | U.S. Cl. | 356/100,<br>350/162 |
|---|---|---|
| [51] | Int. Cl. | G01j 3/06,<br>G01j 3/18 |
| [50] | Field of Search | 350/162;<br>356/79, 95—101 |

[56] References Cited
UNITED STATES PATENTS

| 3,098,408 | 7/1963 | Cary | 356/101 |
|---|---|---|---|
| 3,433,557 | 3/1969 | McPherson | 356/100 X |

*Primary Examiner*—Ronald L. Wibert
*Assistant Examiner*—F. L. Evans
*Attorney*—Limbach, Limbach & Sutton ABSTRACT: A diffraction-grating-type monochromator apparatus having an improved apparatus for rotating the grating is described. The grating is fixedly mounted at the pivot of a follower arm which is pivoted by an arm bearing portion engaging the sloped surface of a wedge-shaped bearing member driven in a direction at an acute angle to the plane of the sloped surface. The wedge-shaped member is a solid wedge or a member in which the acute angle between the sloped surface and the direction of the drive is adjustable.

PATENTED JUL 20 1971    3,594,084
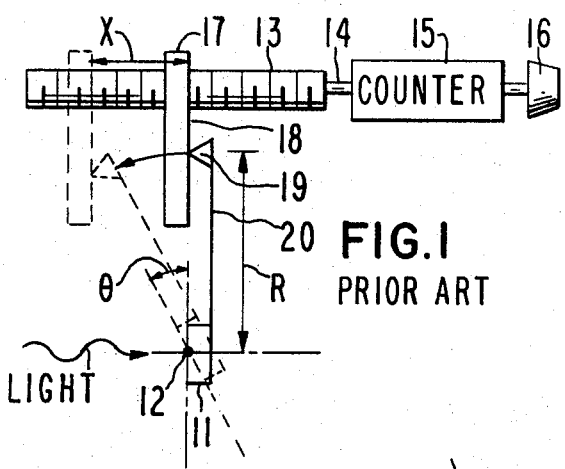
FIG. 1 PRIOR ART
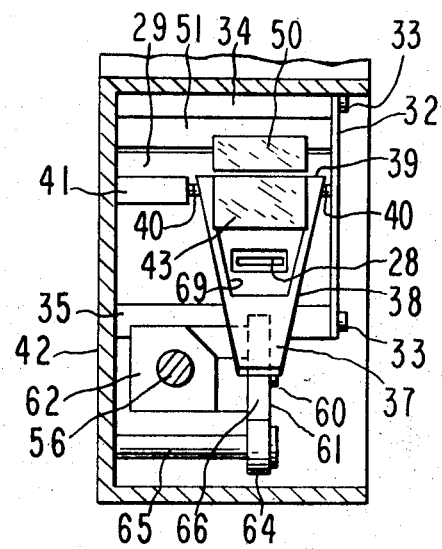
FIG. 5
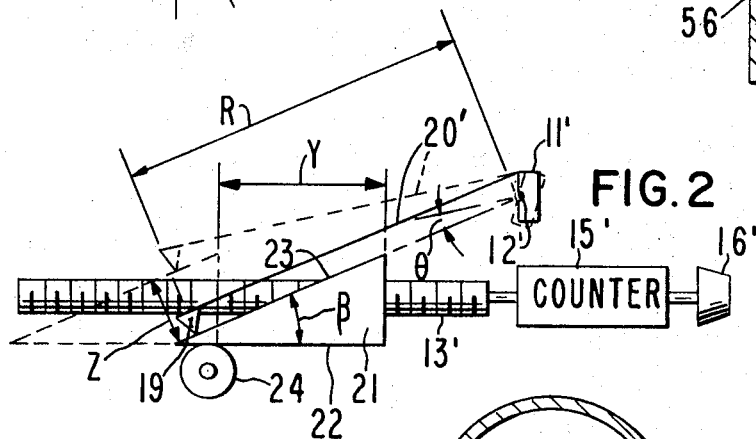
FIG. 2
FIG. 3
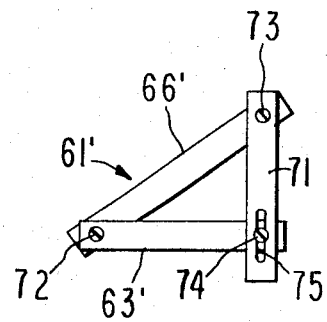
FIG. 6
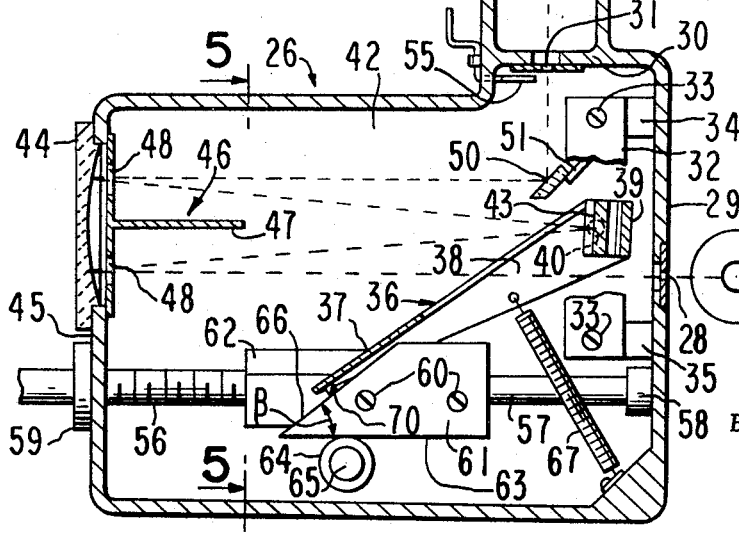
FIG. 4
INVENTOR.
GEORGE K. TURNER
BY
Limbach and Limbach
ATTORNEYS

3,594,084

MONOCHROMATOR APPARATUS HAVING IMPROVED GRATING ROTATION MEANS

BACKGROUND AND BRIEF SUMMARY OF THE INVENTION

In certain monochromator devices multilined diffraction gratings are used to disperse the incoming white or multicolored beam of light into its constituent components in the spectrum. In the utilization of such diffraction gratings, there is a general equation relating the angle to which the diffraction grating is rotated to the wavelength of light which the monochromator passes. The equation is:

(1) $\sin \theta = \kappa \lambda$ where $\theta$ is the angle through which the diffraction grating is rotated, $\lambda$ is the wavelength of light which the monochromator passes, and $\kappa$ is a constant which is largely dependent on the characteristics of the grating, and only slightly affected by other geometrical considerations.

In utilization of the monochromator, it Ynecessary to and to set a very high degree of accuracy the wavelength of light which the monochromator passes. Depending on the particular use for the monochromator, the required accuracy may be from ±5 nanometers in 1000 to ±0.1 or even less nanometers in 1000. To achieve such a precise setting and reading of the wavelength, a multiturn screw mechanism and associated dial or counter is commonly used in the grating rotation assembly, the counter being coupled to the shaft of a fine-threaded drivescrew having a given pitch. The counter or multiturn dial has uniform graduations which give an accurate reading of the position of the grating.

In one commonly utilized form of counter, the counter has 10 numbers per turn of the screw. For rotation of the grating, a bearing member having a flat surface perpendicular to the axis of the screw is threaded on the screw and moves linearly in the direction of the screw axis as the screw turns. The grating is mounted at the pivot point of a pivotally mounted follower arm. A portion of the follower arm spaced a distance R from the pivot point bears against the flat surface of the bearing member. As the bearing member moves linearly along the screw, the follower arm moves with the member and serves to rotate the grating about the pivot point.

As will be explained more fully hereinafter, the number of turns of the screw per nanometer of wavelength $\lambda$ for such existing devices as described above is directly proportional to the pitch P of the screw and the length R of the follower arm. From this relationship it can be seen that, for conventional counters with 10 numbers per turn, the counter being connected directly to the shaft, either the thread must have an exceedingly fine pitch P or the length of the arm R must be exceedingly large. Alternatively, additional gearing, drivebelts or the like which are complicated and expensive are required for effectively increasing the number of turns per nanometer.

Another problem encountered with such grating rotating mechanisms stems from the fact that the factor $\kappa$, which is set by the nature of the grating, varies from grating manufacturer to grating manufacturer. If it is desired to replace one grating in the monochromator with another grating having a different $\kappa$ factor, either the distance R of the screw pitch P must be changed by a very precise amount in order to preserve synchronization between the 10unit-per-turn counter and the wavelength. Meeting this requirement in manufacturing is very difficult.

As still an additional problem, it is very difficult to construct a grating rotational device utilizing a drivescrew and insure that the flat surface of the screw bearing member is uniformly advanced as the screw turns without wobbling, skewing from the perpendicular, etc.

The object of the present invention is to provide an optical rotation mechanism, useful as a grating rotation apparatus, that is of minimum size but is precise, easily adjustable for different gratings and inexpensive to manufacture.

In accordance with this invention, an optical rotation assembly is provided with a bearing member driven by a drive mechanism having a surface inclined at an acute angle to the driven direction and on which a follower arm rides to rotate the optical device or grating attached thereto. The arrangement of the bearing member and the follower arm is such that with a screw drive the ratio of the turns of the screw per nanometer of wavelength are directly proportional to the length of the follower arm and the pitch of the screw and inversely proportional to the sine of the angle $\beta$ that the inclined surface makes with the driven direction. A bearing wedge can be utilized to provide the inclined surface. To accommodate changes in the system, exchangeable wedges can be used or a single wedge with a variable angle bearing surface can be utilized.

By a proper selection of the angle $\beta$ of the wedge bearing member, the pitch P of the thread of the screw can be decreased, such as halved, over the pitch utilized in the prior devices. This coarse thread is much easier to manufacture than the finer thread of the prior devices. In addition, end play in the screw bearings becomes less important.

Another advantage resulting from the new structure lies in the fact that the follower arm extends from the wedge bearing member at an acute angle with respect to the axis of the screw rather than perpendicular to the screw axis as in the prior devices and thereby provides a more compact structure.

If desired, the fine thread screw can be maintained and the length R of the follower arm decreased such as to one-half of its prior length because of the improved turns-per-nanometer relationship obtained with the new structure.

In the instance where it is desired to substitute gratings having different values of $\kappa$, it is only necessary to change the angle $\beta$ of the inclined surface of the bearing member to match the changed $\kappa$ value. The length R of the follower arm and the screw pitch P can be maintained without change.

The wedge bearing member of the present invention is less sensitive to stabilization and alignment problems than the flat surface bearing member of prior devices since errors caused by wobble or eccentricity of the screw with respect to its bearings or misalignment of the axis of the screw are of only secondary importance compared to the wedge angle $\beta$.

These and other features and advantages of the present invention will become more apparent from a perusal of the following specification taken in connection with the attached drawings.

In the drawings:

FIG. 1 is a schematic plan view showing a grating rotation mechanism of the prior art.

FIG. 2 is a schematic plan view illustrating the improved grating rotation mechanism of the present invention.

FIG. 3 is a diagrammatic illustration of the trigonometric relationships between the distance movements of the wedge and follower arm of the mechanism of FIG. 2.

FIG. 4 is a cross-sectional view of a monochromator utilizing the novel grating rotation apparatus of the present invention.

FIG. 5 is a cross-sectional view of a portion of the monochromator device shown in FIG. 3 taken along section line 5-5 therein.

FIG. 6 is a plan view of an alternative embodiment of this invention.

DESCRIPTION OF THE PREFERRED EMBODIMENTS

While the present invention can be utilized in various instrument applications, it is ideally suited for rotation of a grating in a monochromator and, therefore, will be described with respect to such application below.

Referring now to FIG. 1 for an illustration of the prior art, there is shown a plan view of a rotational assembly for a diffraction grating 11 utilized in a monochromator in well-known manner. During use it is desired to rotate the grating about pivot point 12 for color or wavelength selection from the beam of light impinging on the grating. This rotation has been accomplished by utilizing a fine thread screw 13 which is fixedly attached to a shaft 14 of a counter 15 and to a tuning knob 16. The conventional counter 15 consists of a plurality of digit wheels (not shown), each with 10 digits and the total number registered on the counter serving as an indication of the selected wavelength. A bearing member 17, threaded onto the screw 13, has a surface 18 perpendicular to the screw axis and on which rides a portion 19 of a follower arm 20. The arm 20 is pivoted at pivot point 12 and grating 11 is mounted on the arm 20 at the pivot point.

As the screw 13 is rotated, the bearing member 17, which is threaded onto the screw 13, moves linearly along the screw in a direction dependent on the direction of rotation. With linear motion of the bearing member 17, follower arm portion 19 follows bearing member surface 18 and the follower arm 20 and grating 11 rotate about pivot 12.

The distance, designated $X$, which the surface 18 of the bearing member 17 moves is given by the equation:

(2) $X = T/P$ where $X$ is the advance in inches, $T$ is the number of turns of the screw, and $P$ is the pitch of the screw in turns per inch.

The angle, designated $\theta$, through which the follower arm 20 and grating 11 rotate is given by the equation:

(3) $\sin \theta = X/R$ where $R$ is the effective length of the follower arm 20 from the pivot point 12 to the portion 19 contacting the surface 18.

From equations (1), (2), and (3) above, it follows that:

(4) $\sin \theta = \kappa \lambda = X/R = T/(P \cdot R)$ and (5) $T/\lambda = \kappa P R$ (turns per nanometer).

In order for a conventional counter with 10 numbers per turn to be utilized and directly connected to the screw, either the thread of the screw must have an exceedingly fine pitch $P$ or the length $R$ of the arm must be exceedingly long.

Referring to FIG. 2 for a representation of the present invention, my novel structure includes a wedge-shaped bearing member 21 threadably connected to the screw 13 with the bearing surface or long side 23 thereof making an angle $\beta$ with the axis of the screw and the direction of motion of the wedge 21. To guide the wedge 21 to prevent rotation thereof, a roller bearing 24 is secured to the monochromator housing for rolling on the wedge side surface 22.

When the wedge 21 is advanced a distance Y, the sloped surface 23 advances parallel to itself a distance Z as represented in FIG. 3 and the arm 20 and grating 11 rotate through an angle $\theta$ as represented in FIG. 2. By trigonometry, these representations are related by the equation:

(6) $Z = Y \sin \beta$

In this mechanism, Z has the same significance as $X$ in equation (3) while Y has the same significance as $X$ in equation (2). If $P_2$ is the screw pitch of the screw 13′, and $T_2$ is the number of turns of the screw, then (7) $Y = T_2/P_2$ and (8) $Z = Y \sin \beta = (T_2/P_2) \sin \beta$.

From FIG. 2 it can be seen that (9) $\sin \theta = Z/R$.

Then, from equation (1) above

(10) $\sin \theta = Z/R = \kappa \lambda$.

Substituting for Z from equation (8) above

(11) $\sin \theta = (T_2 \sin \beta)/P_2 R = \kappa \lambda$ and

(12) $T_2/\lambda = (\kappa P_2 R)/\sin \beta$ (turns per nanometer).

It will be noted that equation (12) differs from equation (5) only by the term $\sin \beta$. For any given length $R$ of follower arm 20′ and for a wedge with an angle $\beta$ of 30°, the pitch of the thread $P$ may be halved, since the sine of 30° is 0.5. This coarser thread is easier to make and, furthermore, end play in the screw bearings is less important.

Additionally, as apparent from a comparison of FIGS. 2 and 1, the drive mechanism of the present invention with the bearing surface extending at an acute angle to the screw requires far less space than the prior art mechanism with the bearing surface extending normal to the screw.

An optimum value of $\beta$ may be selected for a particular value of $\kappa$ for a grating, and should the $\kappa$ value vary from grating to grating as in the case for gratings made by different manufacturers, the angle $\beta$ may be varied to match. Thus, separate replaceable wedges may be used, or a wedge with an adjustable angle may be employed to simplify manufacture.

Referring now to FIGS. 4 and 5, there is shown a monochromator in a single beam spectrophotometer utilizing the present invention. The monochromator comprises a lightproof housing including a main monochromator compartment 26 and a sample holding compartment 27, the main compartment being provided with an entrance light slit 28 in one wall 29 thereof and an exit light slit 31 in the wall 30, perpendicular to wall 29, and leading to the sample compartment 27.

Inside compartment 26 adjacent slit 28 to a mounting plate 32 is fixedly secured at its ends by screws 33 to two spaced-apart protrusions 34 and 35 extending inwardly from the wall 29. An elongated Δ-shaped follower arm 36 having an apex portion 37, two sidewalls 38 and a base portion 39 is pivotally mounted at the ends of the base 39 on two bearing points 40 between the mounting plate 32 and a short protrusion 41 extending from the backwall 42 of the main compartment. A diffraction grating 43, such as one having 590 lines per mm., is spring mounted on the base 39 between the two sidewalls 38 with the front surface of the grating 43 on the line between the two pivot points 40.

For reflecting light to and from the grating 43, a concave collimator mirror 44 is mounted over an opening in the wall 45 of the compartment 26 opposite to the light entrance wall 29. A T-shaped masking member 46 is mounted on the wall 45 in front of the mirror 44, the masking member being provided with a septum 47 forming the base of the T and a pair of openings 48 in the top of the T through which light may pass to and be reflected from the mirror 44 on opposite sides of the septum 47.

For receiving light from the mirror 44, a rectangular-shaped reflective mirror 50 is fixedly secured to a small plate 51 which is adjustably mounted on and extends from the mounting plate 32, the mirror 50 being mounted on the opposite side of the grating 43 from the slit 28 and angularly positioned for reflection of received light into the sample compartment.

The sample compartment 27 is divided by a baffle 52 into two areas, one of which accommodates the sample container 53 and the other of which carries the photodetector 54. The exit slit 31 is provided with a shutter plate 55 which may be moved to cover the slit for zero-transmittance setting of the spectrophotometer.

For rotating the follower arm 36 and the grating mounted thereon, an adjusting screw 56 having unthreaded end portions 57 is rotatably mounted in bearing members 58 and 59 in the two walls 29 and 45, respectively. A wedge-shaped bearing member 61 is fixedly mounted on a support block 62 as by screws 60, the block having a threaded bore which is threaded on the adjusting screw 56. One leg or edge surface 63 of the wedge member 61 aligned parallel with the axis of screw 56 rests upon a roller bearing 64 which is rotatably mounted on a shaft 65 extended from the backwall 42 of the main compartment. The free end 37 of the follower arm 36 bears against the inclined or sloped bearing surface 66 of the wedge 61 via a projection 70 such as of nylon, the arm 36 being urged into contact with the inclined surface 66 and the leg surface 63 being urged into contact with the roller 64 by a tension spring 67.

In operation, light from a suitable source, such as a tungsten lamp 68, enters the housing through the light entrance slit 28, passes through a central opening 69 in the follower arm 36 and through an opening 48 in the mask member 46 where it strikes one active section of the collimator mirror 44. The light is reflected from the mirror 44 and strikes the grating 43 where it is dispersed in angle according to the color. The selected wavelength of light by reason of the grating angle then passes through the other opening 48 in mask 46 where it strikes the other active section of the collimator mirror 44 and is reflected off angled mirror 50, through the exit slit 31. From slit 31, light passes through the sample 53 under investigation and then through the central opening in the baffle 52 and onto the photodetector 54. Suitable electrical circuits connected to the photodetector 54 will render a reading of the absorbance of the light by the sample.

The grating 43 is rotated to select the desired wavelength light from the beam of light reflected from the active surface of the collimator 46. This grating rotation is accomplished by rotation of the screw 56 resulting in movement of the wedge bearing member 61 to the right or left as viewed in FIG. 4. Movement to the left will result in the follower arm 36 rotating clockwise about the pivot points 40 and movement to the right will result in counterclockwise rotation.

The relationship of the acute angle $\beta$ of the wedge bearing member 61 between surface 66 and surface 63 and the direction of wedge travel as well as the pitch of the screw 56 and the length of the follower arm 36 is given above. The particular relationship may be altered as desired by the operator by the use of interchangeable wedge bearing members 61 or by the use of an adjustable wedge bearing member 61' as shown in FIG. 6. The sloped surface member 66' of this wedge 61' may be adjusted by movement of a vertical arm 71, the wedge member 66' pivoting at points 72 and 73 and being fixedly secured by the adjusting screw 74 which passes through an elongated slot 75 in a portion of the vertical arm 71 crossing the base arm 63' and an aperture in this base arm 63'.

What I claim is:
1. Monochromator apparatus comprising
a diffraction grating,
a light source and mirror apparatus for directing light onto and from said grating to separate said light into spectra by diffraction,
means for mounting said grating for rotational movement comprising
a follower arm,
means for pivotally mounting said follower arm for movement about a pivot point,
said grating being mounted on said arm for rotation about said pivot point as said arm pivots, and
means for pivoting said follower arm comprising
a wedge having a flat base surface and a sloped bearing surface positioned at an acute angle of no more than 45° with respect to said base surface,
a bearing engaging said base surface of said wedge, and
screw means for moving said wedge on said bearing and in a direction parallel to the surface of the base surface,
a portion of said follower arm riding on the sloped surface of said wedge,
said follower arm pivoting about said pivot point as said wedge member moves in said direction.
2. Monochromator apparatus as claimed in claim 1 including means for varying the acute angle between said base surface and said bearing surface of said wedge.